(12) United States Patent
Finck

(10) Patent No.: US 9,862,563 B2
(45) Date of Patent: Jan. 9, 2018

(54) GLAZING PANEL REMOVAL DEVICE AND METHOD

(71) Applicant: BELRON HUNGARY KFT-ZUG BRANCH, Zug (CH)

(72) Inventor: William Finck, Essex (GB)

(73) Assignee: Belron International Limited, Egham (GB)

( * ) Notice: Subject to any disclaimer, the term of this patent is extended or adjusted under 35 U.S.C. 154(b) by 234 days.

(21) Appl. No.: 14/648,748

(22) PCT Filed: Dec. 2, 2013

(86) PCT No.: PCT/GB2013/053181
§ 371 (c)(1),
(2) Date: Jun. 1, 2015

(87) PCT Pub. No.: WO2014/091203
PCT Pub. Date: Jun. 19, 2014

(65) Prior Publication Data
US 2015/0314981 A1    Nov. 5, 2015

(30) Foreign Application Priority Data

Dec. 11, 2012 (GB) .................................... 1222246.9

(51) Int. Cl.
*B65H 49/20* (2006.01)
*B65H 59/00* (2006.01)
(Continued)

(52) U.S. Cl.
CPC ............. *B65H 49/20* (2013.01); *B26D 1/547* (2013.01); *B60J 10/45* (2016.02); *B65H 59/00* (2013.01); *Y10T 29/49718* (2015.01)

(58) Field of Classification Search
CPC ........ B65H 49/20; B65H 59/00; B65H 75/34; B65H 2701/354; B26D 1/547; B26D 7/00;
(Continued)

(56) References Cited

U.S. PATENT DOCUMENTS 5,163,632 A  * 11/1992 Chilcoat .............. B65H 49/325
                                                                242/129.51
5,370,326 A  * 12/1994 Webb ................... B65H 54/547
                                                                242/395

(Continued)

FOREIGN PATENT DOCUMENTS

GB          2465847 A      6/2010
GB          2485612 A      5/2012
(Continued)

*Primary Examiner* — Ghassem Alie
(74) *Attorney, Agent, or Firm* — Gordon & Jacobson, P.C.

(57) ABSTRACT

A glazing panel cut out system for use with a cutting wire in cutting out a vehicle glazing panel cut out procedure has a wire dispenser unit (2) for receiving a spool (4) for dispensing cutting wire the dispenser unit (2) having means for mounting the spool (4) enabling cutting wire to be paid out from the spool. The system also has a winder unit (1) including a spool (4) for winding the cutting wire dispensed from the dispenser unit (2), the winder unit spool (4) enabling the cutting wire to be wound on to the spool (4) during the cut out procedure. The spool (4) is configured to be interchangeably be mounted on both the dispenser unit (2) and the winder unit (1).

12 Claims, 2 Drawing Sheets

(51) Int. Cl.
*B26D 1/547* (2006.01)
*B60J 10/00* (2016.01)

(58) Field of Classification Search
CPC .............. B60J 10/45; Y10T 29/49718; Y10T 156/1184; Y10T 156/1967
USPC .......... 83/13, 39, 200.1, 614, 743–745, 327; 30/372, 116, 272.1, 314, 317; 242/421, 242/588.3, 416; 29/402.03, 281.1, 29/402.08; 156/344, 94, 98, 584
See application file for complete search history.

(56) References Cited

U.S. PATENT DOCUMENTS

| | | | | |
|---|---|---|---|---|
| 6,616,800 B2* | 9/2003 | Eriksson | ............... | B26B 27/002 156/714 |
| 8,474,355 B2* | 7/2013 | Finck | .................... | B26B 27/002 29/402.03 |
| 9,233,478 B2* | 1/2016 | Finck | ......................... | B26B 7/00 |
| 2012/0222527 A1* | 9/2012 | Seebauer | ............... | B26D 1/547 83/13 |

FOREIGN PATENT DOCUMENTS

WO    WO2011/101668 A1    8/2011
WO    WO2012/121631 A1    9/2012

* cited by examiner

GLAZING PANEL REMOVAL DEVICE AND METHOD

CROSS-REFERENCE TO RELATED APPLICATIONS

This application is the national stage of International Patent Application No. PCT/GB2013/053181 filed on Dec. 2, 2013, and which claims priority to British Patent Application No. GB 1222246.9 filed on Dec. 11, 2012, both of which are hereby incorporated by reference in their entireties as if fully set forth herein.

BACKGROUND

1. Field

The present invention relates to a glazing panel removal system and method, and particularly to a glazing panel removal system and method that utilises a cutting wire in order to remove the glazing panel by cutting through the bonding material interposed between the vehicle glazing panel frame opening and the glazing panel.

2. Related Art

Techniques are known utilising a cutting wire to remove a vehicle glazing panel such as a windshield. An exemplary technique is disclosed in GB 2465847, in which a glazing panel removal device is provided with suckers for mounting on the windshield and a pair of spaced winder spools, each for winding in a length of cutting wire. The wire slices through the PU bonding bead positioned between the glazing panel and the vehicle mounting frame. Such techniques are generally extremely effective and efficient in removing glazing panels.

An improved technique and system has now been devised.

SUMMARY

According to the present invention, there is provided a glazing panel cut out system for use with a cutting wire in cutting out a vehicle glazing panel cut out procedure, the system including:
  a wire dispenser unit for receiving a spool for dispensing cutting wire the dispenser unit having means for mounting the spool enabling cutting wire to be paid out from the spool; and;
  a winder unit including;
    at least one spool for winding cutting wire dispensed from the dispenser, the winder unit having means for mounting the spool enabling cutting wire to be wound on to the spool during the cut out procedure; wherein the spool is configured to be interchangeably be mounted on both the dispenser unit and the winder unit.

It is preferred that the winder unit and the dispenser unit include a mounting arranged to mount the spool rotatably on the respective winder or dispenser unit. This can be a commonly configured mounting arranged to mount the spool rotatably on both the respective winder or dispenser unit. A common mounting system for both the dispenser unit and the winder unit simplifies the system design.

Viewed in an alternative aspect, the invention provides a method of removing a glazing panel from a frame in a vehicle using a cutting wire, wherein the cutting wire is wound on a spool of a winder unit during a cut out procedure and the spool is subsequently removed from the winder unit and used to dispense the cutting (already wound on the spool) wire at a subsequent time in further cut out procedure. This enables the cutting wire to be re-used.

According to the invention, therefore, the spool is preferably mounted rotatably on the winder unit during the cutting procedure and subsequently removed and (at a later time) mounted on a dispenser unit to dispense the already used cutting wire during a further cut out procedure.

It is preferred that the winder unit and/or the dispenser unit further comprises a mounting arrangement for mounting the winder unit on the glazing panel;

In a preferred embodiment, the winder unit includes at least one wire wrap around guide element (such as a rotatable pulley) preferably spaced from the winder spool and/or the mounting means.

In one embodiment, the winder unit includes first and second spools for winding the cutting wire wherein each of the first and second spools can interchangeably be mounted on both the dispenser unit and the winder unit.

Typically, in use, the dispenser unit and the winder unit are mounted to opposed faces of the glazing panel.

In a preferred embodiment, the mounting means for the dispenser unit and/or the winder unit comprises a suction mount.

A brake or drag arrangement may beneficially be provided to brake or hinder the paying out of the wire from the dispenser unit.

In one preferred realisation of the invention, on the winder unit two winder spools are arranged in side by side arrangement an a respective wire guide wheel or pulley is positioned outwardly of each respective winder spools.

In a preferred embodiment the winder unit spool or spools mounting includes a ratchet arrangement enabling spool rotation in one or other direction to be inhibited.

According to a further aspect, the invention provides a spool containing a length of already used cutting wire, the spool having a mounting arrangement for mounting on a mounting portion of a dispenser device for use in a cut out procedure.

BRIEF DESCRIPTION OF THE DRAWINGS

The invention will now be further described in a specific embodiment by way of example only and with reference to the accompanying drawings.

DETAILED DESCRIPTION

Figure 1:
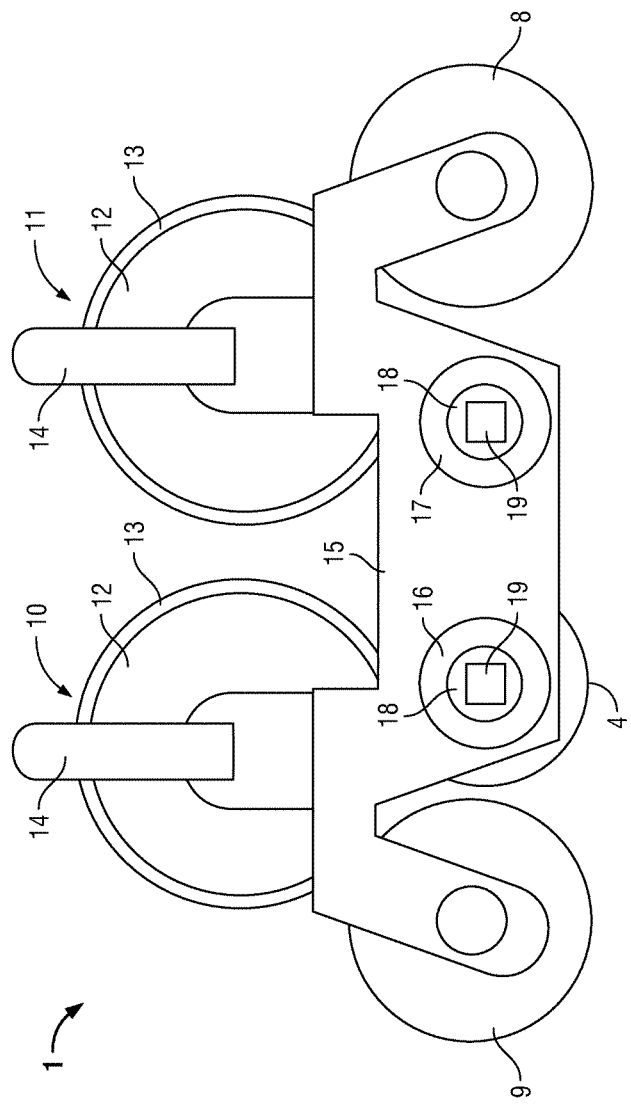
FIG. 1 is a schematic plan view of a winder unit of an exemplary cut out system in accordance with the invention.

Referring to the drawings, and initially to FIGS. 1 to 4, there is shown a cut out system particularly for use in cut out of bonded vehicle glazing panels such as windscreens. The cut out system comprises a winder unit 1 and a wire dispenser unit 2.

The winder unit 1 comprises a pair of releasable suction cup mounts 10, 11 enabling the winder unit to be releasably secured to the windscreen. The suction cup mounts comprise a rigid plastics cup 12 and underlying flexible rubber skirt membrane 13. Respective actuation/release levers 14 enable consistent suction to be applied and released. Such suction mounts are commonly employed in windscreen replacement and repair technology. The suction cup mounts 10, 11 are pivotably/tiltably mounted to the support bracket 15 of the winder unit to ensure that both mounts 10, 11 can locate in good engagement with the windscreen despite the curvature of the windscreen.

The main body of the support bracket 15 carries a pair of axial winding drive bosses 18 which are supported in bearings 16, 17 provided on the winder unit. A wire wind on spool 4 is provided with a mounting ability to be mounted removably under-slung onto either of the respective drive bosses 18. The drive bosses 18 are driven axially rotationally either manually via a hand winder or by means of a mechanical actuator such as a motorised winding or winching tool. In FIG. 1, the wire wind on spool 4 is shown on under slung on to the left hand drive boss 18, but is capable of being removed from the left hand drive boss and mounted for rotation on the right hand drive boss. Drive bosses 18 are provided with female sockets 19 (square bores) for receiving the male driving tool.

Positioned outwardly of the winding spools are respective wire guide pulley wheels 8, 9 of low friction plastics material. The pulley wheels are mounted to be rotatable about respective rotational axes. The guide pulleys rotate as the cutting wire is drawn tangentially across the pulleys as will be described. The winder spools 4, 5 are held to rotate in one direction only (each in opposite senses) by respective ratchet mechanisms. Each mechanism includes ratchet override permitting prior tightened wire to be slackened, or unwound (reverse wound).

Figure 2:
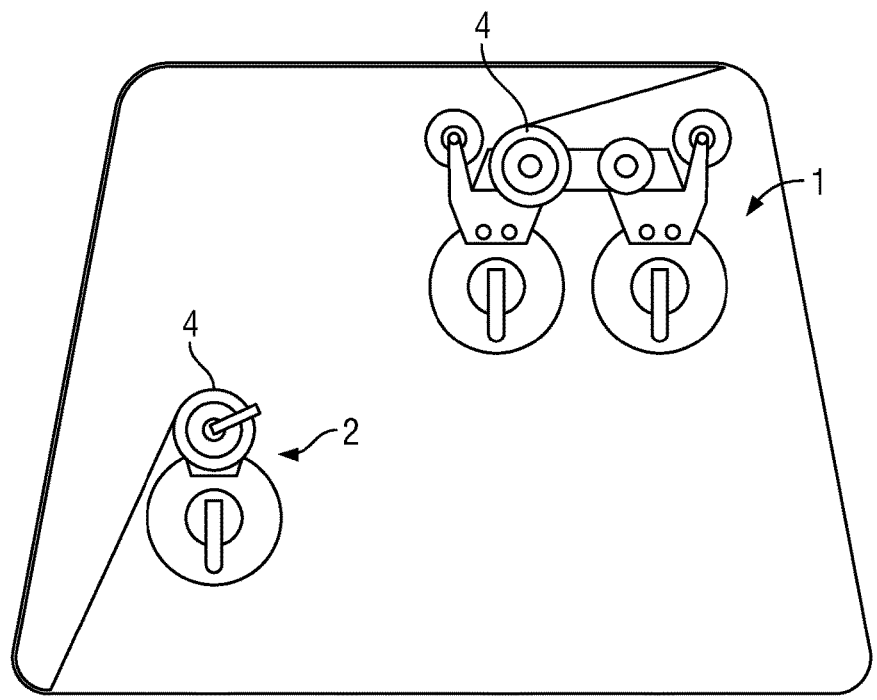
FIG. 2 is a schematic representation of the arrangement in an exemplary mode of use.
Figure 3:
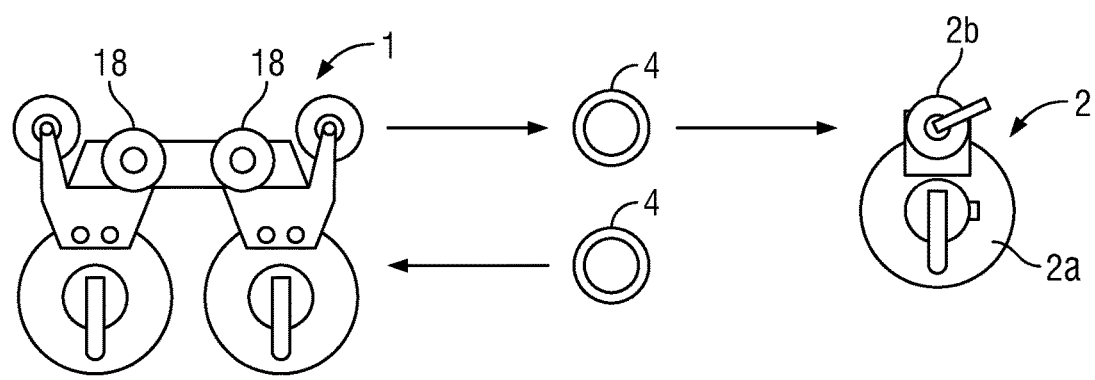
FIG. 3 is a schematic representation showing the inter-change-ability of the wire spools in accordance with the invention.

In common with the technique disclosed in GB 2465847, and as shown in FIG. 2, the winder unit 1 is secured internally of the vehicle to the surface of the glazing panel 3 above the steering wheel. A wire dispenser device or unit 2 is secured to the exterior surface of the glazing panel 3. The dispenser device 2 includes a sucker mount 2a and a mounting 2b that is configured to receive the spool 4 in such a manner that the spool 4 can be rotated to pay out cutting wire from the spool 4 when it is operably mounted with the dispenser device 2.

It will be appreciated that the key to the invention is that the winder unit 1 and the dispenser device 2 should have means (winder unit bosses 18, and dispenser mounting 2b) for commonly mounting the spool 4, permitting the spool 4 to be interchangeably mounted on both the winder unit 1 and the dispenser device 2. The means by which common mounting may be achieved will be various and readily realisable by the skilled addressee.

The invention enables wire (fresh or used) to be paid out from the spool 4 on the dispenser device 2, and subsequently collected on an identical spool 4 mounted on the winder unit 1. Subsequently the collected wire on a spool 4 on a winder unit 4 can be removed, and the spool fitted for dispensing duty on a dispenser device 2.

In use the operation is generally similar to the operational sequence described in GB 2465847. Prior to cutting, the wire 41 is wrapped around the external peripheral edge of the glazing panel as disclosed in GB 2465847. The dispenser spool 4 which is free to rotate as to pay out wire from the dispenser spool as tension of a required magnitude is put upon the wire. An adhesive tape patch may be used to give resistance to paying out of the wire from the spool. Other brake devices (typically resistance or friction providing devices may be used in addition to or as an alternative to the adhesive patch).

During cutting, if excessive resistance occurs, from tough or large PU adhesive beads, the wire is able to spool off the dispenser device 2 and slip and slice past the PU adhesive. The winder unit is moved during the cutting procedure across the windscreen to the other side and re-secured to the windscreen. Prior to repositioning the unit 1, the ratchet of the winder boss 19 carrying winder spool 4 is released to permit the wire to be wound out from the spool 4 as it is moved across the glazing panel to be repositioned. The ratchet is subsequently re-engaged and spool 4 once again operated to wind in the wire.

The present invention provides the benefits of wire cutting systems but has the significant benefit of enabling the cutting wire to be re used as a result of making the spool interchangeably mountable on the dispenser unit 2 and the winder unit 1. This avoids the necessity of unspooling the wire from the winder unit following collection on the winder unit.

The invention claimed is:

1. A glazing panel cut out system for use with a cutting wire in cutting out a vehicle glazing panel cut out procedure, said system including:
    a wire dispenser unit configured to selectively receive at least one spool for dispensing cutting wire, said dispenser unit having means for selectively mounting said at least one spool enabling cutting wire to be paid out from said at least one spool when said at least one spool is mounted to said mounting means of said wire dispenser unit; and
    a winder unit configured to selectively receive said at least one spool for winding cutting wire dispensed from said wire dispenser unit, said winder unit having means for selectively mounting said at least one spool enabling cutting wire to be wound on to said at least one spool during the cut out procedure when said at least one spool is mounted to said mounting means of said winder unit,
    wherein said mounting means of said wire dispenser unit and said mounting means of said winder unit are configured to interchangeably mount to said at least one spool; wherein each of said winder unit and said wire dispenser unit include a commonly configured mounting arranged to mount said at least one spool rotatably on said respective winder unit or said wire dispenser unit.

2. A system according to claim 1, wherein:
said winder unit and said wire dispenser unit include a respective mounting arranged to mount said at least one spool rotatably on said respective winder unit or said wire dispenser unit.

3. A system according to claim 1, wherein:
the winder unit includes at least one wire wrap around guide element spaced from at least one of the spool and the mounting means of the winder unit.

4. A system according to claim 3, wherein:
the wire wrap around guide element comprises a guide wheel or pulley rotatably mounted with respect to the winder unit.

5. A system according to claim 1, wherein:
the winder unit includes first and second spools for winding the cutting wire;
wherein the first and second spools and the wire dispenser unit are configured such that each one of the first and second spools are interchangeably mounted on either one of the wire dispenser unit and the winder unit.

6. A system according to claim 1, wherein:
said wire dispenser unit and said winder unit are mounted to opposed faces of the glazing panel.

7. A system according to claim 1, wherein:
at least one of the wire dispenser unit and the winder unit comprises a suction mount.

8. A system according to claim 1, wherein:
a brake or drag arrangement is provided to brake or hinder the paying out of the wire from the wire dispenser unit.

9. A system according to claim 1, wherein:
on the winder unit two winder spools are arranged in side by side arrangement and a respective wire guide wheel or pulley is positioned outwardly of the respective winder spools.

10. A system according to claim 1, wherein:
the winder unit includes a ratchet arrangement configured to enable spool rotation in a first rotational direction while inhibiting spool rotation in a second rotational direction opposite the first rotational direction.

11. A system according to claim 1, wherein:
said winder unit is configured to wind said cutting wire as said cutting wire is being dispensed from said wire dispenser unit.

12. A glazing panel cut out system for use with a cutting wire in cutting out a vehicle glazing panel cut out procedure, said system including: a wire dispenser unit configured to selectively receive at least one spool for dispensing cutting wire, said dispenser unit having means for selectively mounting said at least one spool enabling cutting wire to be paid out from said at least one spool when said at least one spool is mounted to said mounting means of said wire dispenser unit; a winder unit configured to selectively receive said at least one spool for winding cutting wire dispensed from said wire dispenser unit, said winder unit having means for selectively mounting said at least one spool enabling cutting wire to be wound on to said at least one spool during the cut out procedure when said at least one spool is mounted to said mounting means of said winder unit, wherein said mounting means of said wire dispenser unit and said mounting means of said winder unit are configured to interchangeably mount to said at least one spool; wherein said means of said winder unit for selectively mounting said at least one spool include a plurality of spaced mounts for mounting said at least one spool at unique positions on said winder unit; and said means of said wire dispenser unit for selectively mounting said at least one spool consist of a single mount for mounting said at least one spool at a single position on said wire dispenser unit.

* * * * *